United States Patent Office 3,770,829
Patented Nov. 6, 1973

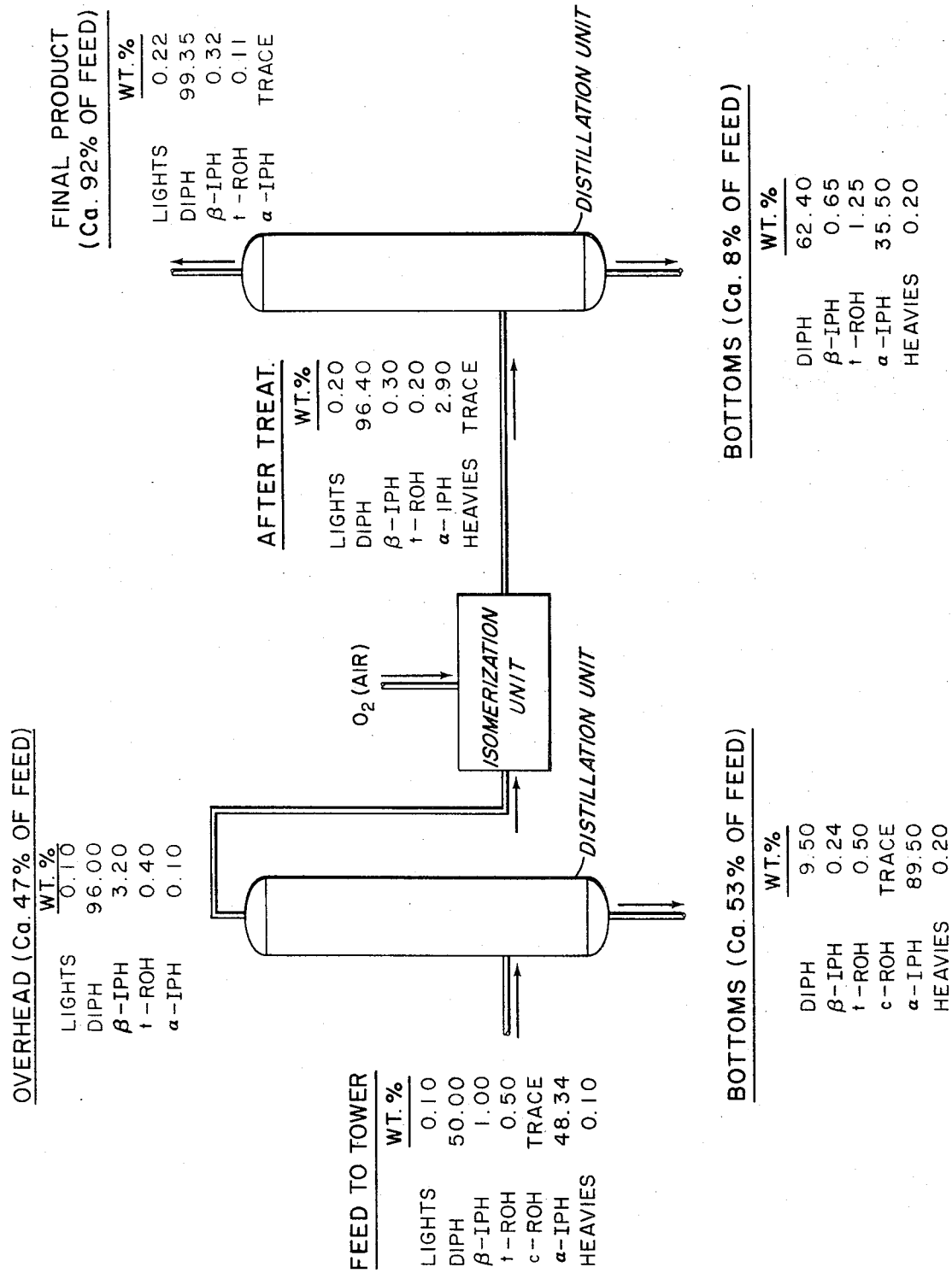

3,770,829
DIHYDROISOPHORONE PURIFICATION PROCESS
William E. Wellman, Edison, Paul E. Burton, Westfield, and William D. Diana, Somerville, N.J., assignors to Esso Research and Engineering Company
Filed Sept. 13, 1968, Ser. No. 759,745
Int. Cl. C07c 45/24
U.S. Cl. 260—586 R
19 Claims

ABSTRACT OF THE DISCLOSURE

Method of purifying an oxygenated hydrocarbon mixture that contains dihydroisophorone and beta-isophorone and alpha-isophorone as major impurities by first separating both dihydroisophorone and beta-isophorone from alpha-isophorone and then heating the dihydroisophorone and beta-isophorone in the presence of a free radical catalyst to substantially isomerize beta-isophorone to alpha-isophorone and thereafter separating the resulting alpha-isophorone from dihydroisophorone to produce a substantially pure dihydroisophorone product.

BACKGROUND OF THE INVENTION

This invention relates to an improved method for the purification of an oxygenated hydrocarbon mixture containing dihydroisophorone and impurities such as beta-isophorone and alpha-isophorone. More particularly, this invention relates to an improved method for the purification of a crude dihydroisophorone feedstock that contains beta-isophorone and alpha-isophorone impurities whereby both dihydroisophorone and beta-isophorone are first separated from alpha-isophorone e.g. by distillation. The distillate comprising dihydroisophorone and beta-isophorone is then heated in a second zone in the presence of a free radical catalyst to substantially isomerize beta-isophorone to alpha-isophorone. The dihydroisophorone is then separated from the alpha-isophorone impurities e.g. by distillation, in order to produce a substantially pure dihydroisophorone product. By means of the present invention, dihydroisophorone of better than 99% purity is readily obtainable by means of conventional distillation, without recourse to very refined distillation techniques, and/or heavy capital investment in highly efficient distillation apparatus.

Isophorone, the precursor of dihydroisophorone, has long been known as an excellent solvent for polymeric materials and more recently has been found to have particular applications in the surface coating field. For example, it is particularly useful as a coil-coating solvent in the final resin formulations employed in the coating of aluminum for house sidings. Isophorone is also useful as a high boiling solvent for many other types of resins, such as nitrocellulose resins and chlorinated rubber resins, as well as alkyd, polyester, epoxy, and acrylic resins. Additionally, isophorone may be employed as a dispersant for lacquers, as a thinner for plastisols and organosols, and in the preparation of chemical intermediates.

Dihydroisophorone is similar to isophorone in terms of the latter's commercial applications, as noted above, but in addition has a number of important advantages over isophorone. As an illustration, the use of isophorone as a high boiling solvent in a coil coating formulation frequently results in coloration of the final product. The utilization of dihydroisophorone as a solvent in such coil coatings results in products with less coloration. Moreover, when employed in coil coating, dihydroisophorone results in decidedly less color development over a wide range of bake schedules as compared to isophorone. This is especially important in situations where the coatings are white in color and utilized for household appliances where yellowing of these white coatings caused by isophorone and/or overbake are quite harmful. In addition, since dihydroisophorone has a faster evaporation rate than isophorone, this results in faster line speeds in coil coating and decreased susceptibility to overbake over the range of bake schedules customarily employed. Dihydroisophorone also has much better color stability on long term storage than isophorone.

Furthermore, another significant advantage of dihydroisophorone is the fact that isophorone contributes to smog whereas dihydroisophorone should not. In connection with recent investigations of air pollution, it has been discovered that unsaturated ketones are highly undesirable contributors to smog whose threat to the public health has long been recognized and whose removal or reduction has long been sought by scientific means and even by local and federal legislation. Industries which commonly utilize solvents such as isophorone do not customarily recover them in their original reusable form but instead allow them to pass as exhaust gases which contribute to the smog in the atmosphere. Thus, there exists a present need for high boiling ketonic solvents that do not promote air pollution and yet have equivalent utility to their objectionable unsaturated ketonic counterparts being presently used.

DESCRIPTION OF THE PRIOR ART

Dihydroisophorone, hereafter referred to as DIPH, is a high-boiling (B.P. 191° C.) cyclic saturated ketone (3,3,5-trimethylcyclohexanone) having the formula:

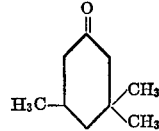

DIPH is usually prepared from alpha-isophorone (alpha-IPH), an unsaturated cyclic ketone (3,5,5-trimethyl-2-cyclohexenone) having the formula:

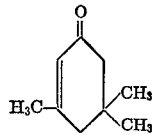

by controlled catalytic hydrogenation. DIPH is an intermediate hydrogenation product of alpha-IPH. DIPH may be further hydrogenated to the cis- and trans-isomers of 3,3,5-trimethylcyclohexanol. The DIPH crude product resulting from such hydrogenation reactions contains unreacted alpha-IPH and its isomer beta-isophorone hereafter referred to as beta-IPH, having the formula:

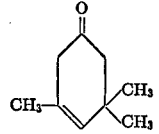

as major impurities, along with additional impurities such as cis- and trans-3,3,5-trimethylcyclohexanol. Thus, it is necessary to remove these impurities, along with lower and higher boilers from the DIPH crude product in order to produce a substantially pure dihydroisophorone product.

The four main impurities previously mentioned as contaminating the crude DIPH product, i.e. beta-IPH, alpha-IPH, and the cis- and trans-isomers of 3,3,5-trimethylcyclohexanol, have boiling points respectively of about 188° C., 215° C., 201° C., and about 194° C. Thus, to one of ordinary skill in the art, assuming his identification of the above four impurities, it would be apparent that alpha-IPH and cis-3,3,5-trimethylcyclohexanol could be readily separated by ordinary commercial distillation techniques. However, the separation of beta-IPH and trans-3,3,5-trimethylcyclohexanol would require special, refined distillation techniques and/or highly efficient special distillation equipment. Accordingly, the considerable expense involved in the purification of DIPH by refined distillation would normally act as a deterrent to commercial acceptance of this method of purification. Moreover, even if refined and high efficient distillation techniques were employed to effect such purification, it would be found that separation of beta-IPH from DIPH is rendered even more difficult due to a net increase in the beta-IPH concentration during the course of distillation.

This net increase in beta-IPH concentration results from the very facile interconversion of alpha-IPH and beta-IPH which can be illustrated by the following equation:

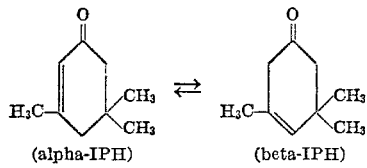

(alpha-IPH)      (beta-IPH)

Thus, during the distillation of a crude DIPH feedstock containing at least the aforementioned four main impurities, appreciable amounts of beta-IPH can build up. Since beta-IPH is much more volatile than alpha-IPH, beta-IPH is taken overhead first. Then, the residual alpha-IPH isomerizes to form more beta-IPH, which, in turn, is again removed overhead. The result is a net increase in the beta-IPH impurity. This isomerization can be avoided by running the distillation at low pressures (5–50 mm. of mercury) but this is impractical since it greatly increases the expense of a commercial operation.

A process for purifying dihydroisophorone feedstocks was recently claimed in our application given U.S. Ser. No. 609,214, now U.S. Pat. No. 3,397,120. This process teaches and claims that dihydroisophorone mixtures can be purified by first reducing the alpha-isophorone concentration in the crude DIPH mixture by distillation. The overhead product of such a distillation comprising beta-IPH and DIPH is then thermally treated, preferably in the presence of acidic or basic catalysts, to isomerize the beta-IPH to alpha-IPH. Thereafter, DIPH, of the desired purity, is then separated from alpha-IPH by distillation.

SUMMARY OF THE INVENTION

It has now been discovered that beta-IPH oxidizes much more rapidly than alpha-IPH and that the oxidation product of beta-IPH (e.g. a hydroperoxide) is an excellent catalyst for isomerizing beta-IPH to alpha-IPH. The free radical catalyst formed by oxidizing beta-IPH (e.g. a hydroperoxide, peroxide, etc.) may be added to the DIPH mixture containing beta-IPH and minor amounts of alpha-IPH to effect such isomerization. More preferably, the free radical catalyst is generated in situ by passing oxygen or an oxygen containing gas stream into the DIPH mixture containing beta-IPH and a minor amount of alpha-IPH. Not only does the in situ formation of the free radical catalyst alleviate the need for the separate preparation of a catalyst, but the air blowing procedure has the added advantage of oxidizing part of the alcohol contaminant (3,3,5-trimethylcyclohexanol) to DIPH. Hence, not only is the alcohol contaminant removed from the DIPH mixture, but it is converted to DIPH increasing the overall yield of the final (DIPH) desired product.

In accordance with the broad aspect of this invention, the alpha-IPH concentration in the DIPH feed is first reduced by distillation. This results in some generation and buildup of the lower boiling beta-IPH impurity. This newly formed beta-IPH, together with the beta-IPH originally contained in the feed passes overhead with DIPH. This overhead product of such distillation is then heated in a second zone in the presence of a free radical catalyst at a temperature sufficient to isomerize beta-isophorone substantially to alpha-isophorone without causing pyrolysis of the remaineder of the distillate. Thereafter, DIPH in excess of 99% purity is separated from the alpha-IPH by distillation. Thus, it can be seen that the critical step in the present purification process is the conversion of the beta-IPH to alpha-IPH. Such isomerization of the beta-IPH to alpha-IPH allows DIPH of the requisite purity to be readily separated from the alpha-IPH by means of ordinary distillation based on the large temperature differential in the boiling points of DIPH and alpha-IPH.

In a preferred embodiment of the instant invention, the free radical catalyst which catalyzes the isomerization of beta-IPH to alpha-IPH is produced by contacting the DIPH and beta-IPH mixture with oxygen or an oxygen-containing gas stream. By contacting the DIPH and beta-IPH mixture with oxygen or an oxygen-containing gas stream, beta-IPH is believed to be oxidized to a hydroperoxide which then catalyzes the isomerization of beta-IPH to alpha-IPH. Thus, it has been discovered that beta-IPH oxidizes much more rapidly than alpha-IPH and the oxidation product catalyzes the isomerization of beta-IPH present in the overhead distillation product to alpha-IPH. While not wishing to be bound to any particular theory, it is believed that the beta-IPH upon contact with oxygen undergoes the following reactions:

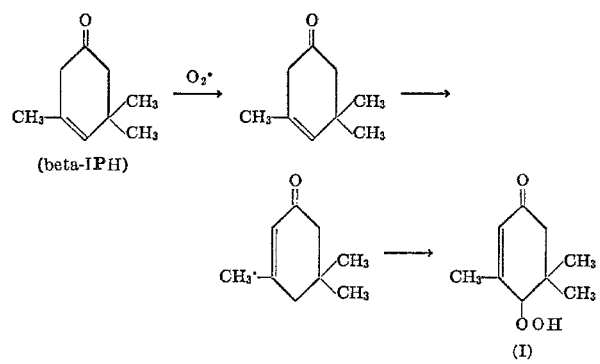

The hydroperoxide (I) which is formed by oxidizing beta-IPH in situ is believed to undergo the following reactions:

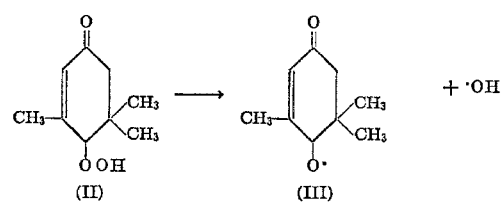

in order to form the active free radicals (II) and (III), either of which is believed to catalyze the isomerization of beta-IPH to alpha-IPH.

As mentioned above, beta-IPH and alpha-IPH exist in equilibrium. When a substantially pure DIPH product (greater than 99+% DIPH) is desired, the first step of the purification process is the removal of essentially all of the alpha-IPH from the crude DIPH mixture. In the substantial absence of alpha-IPH, the free radical isomerization of beta-IPH is shifted more completely to the selective formation of the alpha-IPH isomer. Thereafter, a substantially pure DIPH product is readily separated from all of the alpha-IPH then present by means of ordinary distillation.

The contacting of the DIPH and beta-IPH mixture with oxygen in order to form the hydroperoxide (I) which then catalyzes the isomerization is the preferred method of carrying out the instant invention. Pure oxygen or an oxygen-containing gas stream, e.g. air, may be employed in order to effect the in situ formation of the active free radical which catalyzes the isomerization. The amount of oxygen which is contacted with the DIPH and beta-IPH mixture can vary from 0.01 to 20.0 moles of oxygen per hour per mole of beta-IPH initially present in the crude DIPH product. More preferably, 0.1 to 5.0 moles of oxygen per hour per mole of beta-IPH initially present in the DIPH feed are employed in order to effect the conversion of the beta-IPH isomer to alpha-IPH.

In addition to the rapid conversion of the beta-IPH to the alpha-IPH isomer, the air blowing procedure has another important advantage. As mentioned above, two of the four main impurities which normally contaminate the DIPH feedstock are the cis- and trans-3,3,5-trimethylcyclohexanol. The in situ formation of the hydroperoxide not only results in a rapid isomerization of the beta-IPH to alpha-IPH, but in addition oxidizes these alcohol contaminants to DIPH. This removal of the alcohol contaminants by their conversion to DIPH increases the overall yield of the desired product. Furthermore, the use of the preferred air blowing procedure further reduces the beta-IPH concentration in the distillate formed in the first reaction zone by oxidizing some of the beta-IPH to heavy products, e.g. 3,5,5-trimethylcyclohexene-2-dione-1,4, which can easily be separated from the desired DIPH product in the final distillation step.

While the foregoing discussion has focused attention on the preferred method of oxidizing beta-IPH to the hydroperoxide by contacting the mixture comprising DIPH and beta-IPH with an oxygen-containing gas stream, the isomerization to alpha-IPH can also be accelerated and effectively obtained by the addition of a peroxide or hydroperoxide into the isomerization zone. A hydroperoxide having the general formula: ROOH wherein R is a $C_2$ to $C_{15}$ moiety and is alkyl, cycloalkyl, aryl or aralkyl is believed to undergo the following breakdown: ROOH→RO•+•OH in order to form the active free radicals which catalyze the isomerization of beta-IPH to alpha-IPH. Non-limiting examples of hydroperoxides which undergo the above-described breakdown in order to form the active free radical which catalyzes the isomerization are as follows: t-butyl hydroperoxide, p-menthane hydroperoxide, pinene hydroperoxide, cumene hydroperoxide, 2,5-dimethylhexane-2,5-dihydroperoxide, and [3,5,5-trimethylcyclohexen-2-one]-4-yl hydroperoxide.

Likewise, peroxides having the general formula: ROOR wherein R is a $C_2$ to $C_{15}$ moiety and is alkyl, cycloalkyl, aryl or aralkyl are believed to undergo an identical breakdown: ROOR→2RO• in order to form the active free radical which can catalyze the isomerization. Representative, non-limiting examples of such peroxides which undergo the formation of the active free radical are as follows: dicumyl peroxide and di-t-butyl peroxide. The amount of peroxide or hydroperoxide which is added to the isomerization zone in order to effect the isomerization of beta-IPH to alpha-IPH can range from 0.01 to 10.0 weight percent based on the amount of beta-IPH present in the distillate from the first purification tower, and more preferably from 0.1 to 5.0 mole percent.

In an alternative two step-embodiment of this invention, especially applicable when the original DIPH feedstock is relatively pure or has a relatively low alpha-IPH content compared to that of the beta-IPH or when a DIPH product of less than 99+% purity is desired, the first distillation step can be omitted. Then the crude DIPH feedstock is sent directly to the isomerization unit where it is treated with oxygen to form the hydroperoxide in order to isomerize the beta-IPH present to its higher boiling isomer alpha-IPH. The effluent from this treatment consisting essentially of DIPH and alpha-IPH can then be distilled so as to separate the DIPH as a distillate from the residue comprising alpha-IPH.

All of the previous simplified means for the purification of dihydroisophorone, as hereinabove discussed, can be utilized with ordinary distillation equipment and conventional distillation techniques. However, in order to obtain above 99% purity of dihydroisophorone it is recognized that the overhead product in the first distillation containing essentially dihydroisophorone and beta-isophorone, could be subsequently distilled in a very efficient column in order to separate the dihydroisophorone from the beta-isophorone without prior isomerization of the beta-isophorone to alpha-isophorone. However, the required distillation column for such a distillation would require at least two to three times as many theoretical plates as that required to separate alpha-isophorone from dihydroisophorone. Such an efficient second column would enable beta-isophorone to pass as an overhead product and separate dihydroisophorone as a bottoms product, which must then be flash distilled in still another unit to yield the desired dihydroisophorone greater than 99% purity. But as can be seen, this method of purification is quite costly and requires expensive equipment, and is accordingly inferior to the simplified methods of purification proposed above for the practice of this invention.

DESCRIPTION OF THE PREFERRED EMBODIMENT

In the most preferred embodiment of this invention, a three-stage process is employed to give the desired purity of DIPH. FIG. 1, which is a flow diagram of this preferred embodiment, illustrates a method for producing DIPH of the desired purity (herein greater than 99+% DIPH) which comprises two separate distillations and an isomerization unit interposed between these distillations.

In the first stage of this process, a crude DIPH feedstock is distilled in a reasonably efficient tower to remove the alpha-IPH, cis-3,3,5-trimethylcyclohexanol, and part of the trans-3,3,5-trimethylcyclohexanol. Typical conditions for this distillation stage involve the operation of a 5 to 50 theoretical plate tower, preferably a 20 plate tower, operating without reflux or utilizing a 0 to 100/1 reflux ratio, preferably a 10/1 reflux ratio, whereby most of the DIPH and beta-IPH is taken overhead. Consequently, most of the DIPH and beta-IPH are taken overhead while most of the alpha-IPH and cis-3,3,5-trimethylcyclohexanol remain as a bottoms product. The trans-3,3,5-trimethylcyclohexanol partitions between the overhead and bottoms. There is some buildup of beta-IPH due to the isomerization of alpha-IPH to beta-IPH, and this additional beta-IPH is taken overhead. This isomerization could be minimized, if desired, by distilling at reduced pressure, although this would not be necessary.

The overhead product from this distillation would comprise about 96 to 97% DIPH and about 3 to 4% beta-IPH. The recovered alpha-IPH, contained in the bottoms product, would contain about 85–95% alpha-IPH and could be recycled back to the hydrogenator and hydrogenated under the desired conditions to form more DIPH crude.

In the second stage of the three-stage process, the DIPH/beta-IPH overhead product from the first stage is heated in the second zone in the presence of a free radical type catalyst at a temperature sufficient to isomerize the beta-isophorone substantially to alpha-isophorone. Preferably, the free radical type catalyst is produced by contacting the distillate from zone 1 in a second zone with oxygen or an oxygen-containing gas stream at a temperature sufficient to isomerize beta-isophorone substantially to alpha-isophorone. In another preferred method of carrying out the isomerization step, the free radical which catalyzes the isomerization of beta-IPH to alpha-IPH is produced by adding a peroxide or hydroperoxide to the distillate of zone 1 in the second zone, and heating said distillate in the second zone at a temperature sufficient to isomerize beta-isophorone substantially to alpha-isophorone. In the most preferred method of carrying out this isomerization step, the free radical which catalyzes the isomerization is produced by either the in situ formation (air blowing) or addition of [3,5,5-trimethyl-cyclohexen-2-one]-4-yl hydroperoxide having the formula:

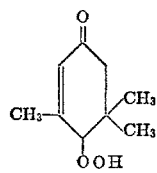

The temperature, pressure and residence times for this isomerization step can obviously vary depending on the starting feed composition and on the ultimate purity desired for the final product. The higher the temperature, up to a practical maximum of 300° C., the faster the isomerization and shorter the residence time required. The temperatures which can be employed in this isomerization range from about 100° to about 300° C., preferably 150° to 225° C. and more preferably 150 to 180° C. Generally, atmospheric pressure is used in the isomerization zone although obviously higher or lower pressures may be employed depending on the temperature.

The residence time for the distillate from zone 1 in the isomerization unit (zone 2) can vary from 0.05 to 15 hours and more preferably from 0.25 to 6 hours. Likewise, higher or lower temperatures can also be used with a corresponding adjustment in the residence time, the general rule being that the higher the temperature, the shorter the residence time.

In the third stage of this preferred process, the product from the isomerization zone of the second stage is distilled in order to separate the DIPH from the newly formed alpha-IPH. While the conditions of this distillation are not critical, it is desirable to operate this distillation in such a manner as to minimize or eliminate any additional buildup of beta-IPH. Since the separation of DIPH from alpha-IPH in the third stage is not very difficult by means of distillation, this allows a distillation tower of fewer plates and lower reflux ratios than used in the first stage distillation. This also results in a lower residence time during the distillation; hence, little beta-IPH is generated from isomerization of alpha-IPH. A typical set of conditions used in this distillation involve a 5 to 25 theoretical plate tower, preferably a 20 plate tower, operated without reflux or with reflux at reflux ratios up to 50 to 1, preferably a 1/1 reflux ratio. Preferably, although not necessarily, this distillation can be carried out at reduced pressure in order to reduce the isomerization of alpha-IPH to beta-IPH. Pressures in the order of 50 to 100 millimeters of mercury are sufficient to reduce this isomerization; of course, even lower pressures can be used to further inhibit this isomerization.

This invention is further illustrated in great detail by the following examples, but it is to be understood that the present invention in its broadest aspects is not necessarily limited to the specific temperatures, residence times, and catalyst, and other conditions set forth therein.

Example 1

In this example, DIPH, produced by the hydrogenation of alpha-isophorone and containing: unreacted alpha-IPH, beta-IPH, and the products of overhydrogenation, cis- and trans-3,3,5-trimethylcyclohexanol (abbreviated hereinafter in the tables as "C—ROH" and "t—ROH"), was purified by means of continuous distillation under varying conditions and with different feed compositions. The results and conditions of purification are shown in Table 1.

TABLE 1.—PURIFICATION OF CRUDE DIPH BY CONTINUOUS DISTILLATION

| Run number | Conditions | | | | Compositions, wt. percent | | | | | |
|---|---|---|---|---|---|---|---|---|---|---|
| | No. actual plates | Reflux ratio | Percent overhead | | DIPH | α-IPH | β-IPH | t-ROH | c-ROH | Other |
| 1 | 60 | 30/1 | 20 | Feed | 68.7 | 20.0 | .46 | 2.0 | 8.0 | .84 |
| | | | | Overhead | 94.8 | | .93 | .52 | .05 | 3.7 |
| | | | | Bottoms | 60.4 | 26.7 | .18 | 2.2 | 9.9 | .62 |
| 2 | 60 | 12/1 | 19 | Feed | 68.7 | 20.0 | .46 | 2.0 | 8.0 | .84 |
| | | | | Overhead | 92.9 | .10 | .90 | .87 | .10 | 5.0 |
| | | | | Bottoms | 62.8 | 25.1 | .28 | 2.1 | 9.5 | .22 |
| 3 | 60 | 30/1 | 21 | Feed | 79.0 | 7.2 | .32 | 2.4 | 10.2 | .88 |
| | | | | Overhead | 94.8 | .04 | .52 | .63 | .04 | 4.0 |
| | | | | Bottoms | 74.4 | 9.5 | .19 | 2.9 | 12.9 | .11 |
| 4 | 60 | 12/1 | 21 | Feed | 79.0 | 7.2 | .32 | 2.4 | 10.2 | .88 |
| | | | | Overhead | 94.8 | | .53 | 1.0 | .10 | 3.6 |
| | | | | Bottoms | 75.6 | 9.0 | .15 | 2.7 | 12.4 | .15 |
| 5 | 40 | 35/1 | 55 | Feed | 60.1 | 39.3 | .21 | .12 | Tr. | .27 |
| | | | | Overhead | 96.5 | .15 | 3.1 | .11 | | .14 |
| | | | | Bottoms | 15.4 | 83.6 | .38 | .08 | .05 | .49 |
| 6 | 40 | 30/1 | 56 | Feed | 56.1 | 34.2 | 6.5 | .36 | .32 | 2.5 |
| | | | | Overhead | 88.1 | .80 | 9.0 | .28 | .04 | 1.8 |
| | | | | Bottoms | 14.9 | 82.2 | .36 | .16 | .27 | 2.2 |

As may be noted, Run #1 illustrates buildup of beta-IPH in the overhead product and also shows that trans-3,3,5-trimethylcyclohexanol partitions between the overhead product and the bottoms product.

Run #2 shows that a lower reflux ratio gives more trans-alcohol than does Run #1.

Runs #3 and #4 show that a DIPH crude feedstock containing a lower alpha-IPH concentration results in less beta-IPH in the overhead product.

Run #5 illustrates a large buildup of beta-IPH in both the overhead and bottoms product.

Example 2

This example shows that the levels of impurities in the DIPH crude feedstock may vary considerably and also indicated that the impurity levels depend upon the conversion in the hydrogenation reaction.

In this example, two separate hydrogenation runs were conducted with varying feeds and at various conversion levels. The results of these runs are shown in Table 2.

TABLE 2.—HYDROGENATION OF A FEEDSTOCK OF RELATIVELY HIGH β-IPH CONCENTRATION

| Run # | Composition, wt, percent | | | | | |
|---|---|---|---|---|---|---|
| | α-IPH | β-IPH | DIPH | t-ROH | c-ROH | Other |
| 1 Feed | 89.9 | 6.8 | | | | 3.3 |
| Product at various conversion of α-IPH levels | 35.0 | 6.5 | 55.3 | .31 | .06 | 2.8 |
| | 25.0 | 5.7 | 65.7 | .33 | .15 | 3.1 |
| | 14.3 | 5.4 | 76.2 | .54 | .26 | 3.3 |
| | 4.7 | 5.4 | 85.3 | .94 | .52 | 3.1 |
| 2 Feed | 95.0 | 1.7 | | | | 3.3 |
| Product at various conversion of β-IPH levels | 31.6 | 1.5 | 63.1 | .37 | .17 | 3.3 |
| | 4.9 | 1.2 | 88.1 | 1.59 | .72 | 3.5 |

Table 2 shows that if the alpha-isophorone feed contains a high concentration of beta-isophorone, then the crude DIPH reaction product is also high in beta-isophorone. This occurs because beta-isophorone is only slightly hydrogenated to dihydroisophorone in the presence of alpha-isophorone, since the alpha-isophorone is much more strongly adsorbed on the catalyst. The net result is that most of the beta-isophorone, which is present in the feed, remains in the crude dihydroisophorone reaction product, thus complicating the distillation requirements.

Table 3 below shows that the impurity level also depends on the conversion in the hydrogenation reaction. At low conversions, there is little alcohol formation, but as conversion increases, so does alcohol formation. However, the level of beta-isophorone remains relatively constant regardless of conversion. However, as conversion increases, the amount of dihydroisophorone also increases, and the ratio of beta-IPH/DIPH decreases; this, in effect, lowers the beta-IPH concentration. Thus, the overall net effect can be described as follows: high conversion gives low beta-IPH but high alcohol formation; low conversion gives low alcohol formation but high beta-IPH concentration.

TABLE 3.—EFFECT OF CONVERSION LEVEL ON IMPURITY CONCENTRATION

| Conversion, percent | DIPH | α-IPH | β-IPH | t-ROH | c-ROH | Other |
|---|---|---|---|---|---|---|
| 0 | 0 | 99.3 | .34 | 0 | 0 | .27 |
| 6.8 | 7.0 | 92.5 | .36 | | | .17 |
| 13.5 | 13.6 | 85.8 | .30 | | | .24 |
| 33.9 | 33.7 | 65.4 | .39 | .14 | .11 | .30 |
| 55.3 | 54.5 | 44.2 | .38 | .45 | .24 | .30 |
| 65.6 | 64.4 | 33.8 | .40 | .62 | .38 | .42 |
| 76.3 | 74.6 | 23.2 | .39 | .86 | .60 | .37 |
| 88.6 | 85.6 | 11.1 | .32 | 1.15 | 1.47 | .31 |
| 97.0 | 92.2 | 2.7 | .27 | 1.70 | 2.61 | .51 |
| 99.5 | 90.4 | .3 | .25 | 2.81 | 5.71 | .49 |

Example 3

In this example, mixtures of DIPH (95%) and β-IPH (5%) were subjected to various isomerization catalysts in order to convert β-IPH to α-IPH. Three different systems were employed. The control, summarized in Table 3A is the non-catalyzed, thermal isomerization at 150° C. The next isomerization, Table 4, was conducted in the presence of a catalyst. The catalyst was the peroxide (I) formed by oxidation of β-IPH, i.e. (3,5,5-trimethylcyclohexen-2-one)-4-yl hydroperoxide. The third isomerization, Table 5, was catalyzed by bubbling air through the reaction mixture.

It can readily be seen that the addition of 1% of the peroxide accelerated the isomerization of β-IPH to α-IPH; and the in situ peroxide formation, resulting from air-blowing, gave an even greater acceleration in the rate of isomerization.

TABLE 3A.—BETA THERMAL ISOMERIZATION OF β-IPH IN A DIPH/β-IPH MIXTURE AT 150° C.

| | Composition, wt. percent | | |
|---|---|---|---|
| Isomerization time, min. | DIPH | β-IPH | α-IPH |
| 0 | 94.8 | 5.0 | 0.23 |
| 55 | 94.8 | 5.0 | 0.25 |
| 165 | 94.8 | 4.9 | 0.29 |
| 315 | 94.8 | 4.9 | 0.30 |
| 1,325 | 94.8 | 4.5 | 0.71 |
| 1,415 | 94.8 | 4.5 | 0.75 |
| 1,715 | 94.8 | 4.4 | 0.83 |
| 2,795 | 94.8 | 3.5 | 1.73 |

TABLE 4.—ISOMERIZATION OF β-IPH IN A DIPH/β-IPH MIXTURE AT 150° C. IN THE PRESENCE OF 1% HYDROPEROXIDE [1]

| | Composition, wt. percent | | |
|---|---|---|---|
| Isomerization time, min. | DIPH | β-IPH | α-IPH |
| 0 | 94.8 | 5.0 | 0.23 |
| 45 | 94.8 | 4.9 | 0.30 |
| 90 | 94.8 | 4.8 | 0.39 |
| 150 | 94.8 | 4.7 | 0.53 |
| 210 | 94.8 | 4.5 | 0.72 |
| 330 | 94.8 | 4.1 | 1.06 |
| 1,320 | 94.8 | 2.7 | 2.49 |
| 1,530 | 94.8 | 2.6 | 2.58 |
| 1,710 | 94.8 | 2.6 | 2.63 |
| 2,790 | 94.8 | 2.0 | 3.23 |

[1] (3,5,5-trimethylcyclohexen-2-one)-4-yl hydroperoxide.

TABLE 5.—ISOMERIZATION OF β-IPH IN A DIPH/IPH MIXTURE AT 150° C. ACCOMPANIED BY AIR-BLOWING [1]

| | Composition, wt. percent | | |
|---|---|---|---|
| Isomerization time, min. | DIPH | β-IPH | α-IPH |
| 0 | 94.5 | 5.06 | 0.45 |
| 190 | 94.5 | 1.62 | 3.89 |
| 370 | 94.5 | 0.34 | 5.17 |
| 1,360 | 94.5 | Trace | 5.51 |

[1] The isomerization was catalyzed by bubbling air through the mixture at a rate of 10.4 liters/hr./liter of solution.

Example 4

This example shows the effect of the rate of air flow on the isomerization of β-IPH to α-IPH. The experiment was conducted at 150° C. at a constant stirring rate, varying the air flow. As shown in Table 6, the rate of isomerization of β-IPH increases with increasing air flow.

TABLE 6.—EFFECT OF INCREASING AIR FLOW ON RATE OF β-IPH ISOMERIZATION [1]

| | β-IPH, wt. percent at— | | Percent isomerization of β-IPH |
|---|---|---|---|
| Moles air/hr./mole β-IPH | 0 min. | 240 min. | |
| 1.2 | 5.3 | 1.2 | 77.4 |
| 4.9 | 4.9 | 0.6 | 87.8 |
| 8.3 | 5.9 | 0.4 | 93.1 |

[1] Temp.=150° C.

Example 5

This example shows the effect of temperature on the air-blown catalyzed isomerization of a β-IPH/DIPH mixture. As shown in Table 7, the rate of isomerization of β-IPH increases with increasing temperature.

TABLE 7.—EFFECT OF TEMPERATURE ON RATE OF β-IPH ISOMERIZATION [1]

| | β-IPH, Wt. percent at— | | Percent Isomerization of β-IPH |
|---|---|---|---|
| Reaction temp., ° C. | 0 min. | 240 min. | |
| 120 | 6.1 | 3.0 | 51.0 |
| 150 | 4.9 | 0.6 | 87.8 |
| 180 | 4.7 | 0.3 | 93.6 |

[1] The isomerization was catalyzed by bubbling air through the mixture at a rate of 5 moles air/hr./mole β-IPH in the feed.

Example 6

In this example a solution containing β-IPH, DIPH, and cis- and trans - 3,3,5 - trimethylcyclohexanol (designated c-ROH and t-ROH) was heated at 150° C. and air was bubbled through the solution. As shown in Table 8, the β-IPH, c-ROH and t-ROH all decreased in concentration with increasing time; while the α-IPH, DIPH, and others increased. Thus part of the β-IPH was isomerized to α-IPH, part of the c-ROH and t-ROH were oxidized to DIPH, and a part of the β-IPH and c-ROH and t-ROH were converted to lighter and heavier boiling components designated as others.

TABLE 8.—ISOMERIZATION OF β-IPH IN A DIPH/β-IPH/ROH MIXTURE AT 150° C. ACCOMPANIED BY AIR-BLOWING

| Isomerization time, min. | Composition, wt. percent | | | | | |
|---|---|---|---|---|---|---|
| | DIPH | β-IPH | t-ROH[1] | c-ROH[1] | α-IPH | Other |
| 0 | 91.6 | 5.86 | 1.53 | 0.26 | 0.33 | 0.38 |
| 90 | 93.1 | 3.29 | 1.18 | 0.22 | 1.13 | 1.10 |
| 150 | 93.2 | 2.15 | 1.16 | 0.22 | 1.80 | 1.45 |
| 245 | 93.0 | 1.49 | 1.05 | 0.21 | 2.45 | 1.79 |
| 300 | 93.3 | 1.31 | 0.82 | 0.20 | 2.46 | 1.91 |
| 1,265 | 94.1 | 0.44 | 0.25 | 0.11 | 2.21 | 2.89 |

[1] Cis- and trans-3,3,5-trimethylcyclohexanol.
[2] The isomerization was catalyzed by bubbling air through the mixture at a rate of 40 liters/hr./liter of solution.

Example 7

This example illustrates the preferred three-stage process of this invention. In this example, a crude DIPH feed was run through a 40 plate column at 20/1 reflux ratio under atmospheric conditions to yield the following products.

Overhead product—about 47% of feed
Bottoms product—about 53% of feed

| | Composition, wt. percent | | | | | |
|---|---|---|---|---|---|---|
| | Lights | DIPH | β-IPH | t-ROH | c-ROH | α-IPH | Heavies |
| Feed | 0.10 | 50.0 | 1.00 | 0.50 | Trace | 48.3 | 0.10 |
| Overhead | 0.10 | 96.0 | 3.20 | 0.40 | | 0.10 | |
| Bottoms | | 9.5 | 0.24 | 0.50 | Trace | 89.5 | 0.20 |

The overhead stream was then passed into an isomerization zone where the temperature was maintained at 180° C. for 4 hours. In this isomerization unit, air was bubbled through the liquid at a rate of 20 liters/hr./liter of liquid in order to isomerize the β-IPH to α-IPH and to oxidize part of the t-ROH. Analyses of the stream passing from the isomerization unit were as follows:

COMPOSITION, WEIGHT PERCENT
Effluent from isomerization

| | |
|---|---|
| Lights | 0.20 |
| DIPH | 96.4 |
| β-IPH | 0.30 |
| t-ROH | 0.20 |
| α-IPH | 2.90 |
| Heavies | trace |

The product resulting from the isomerization unit was then distilled in order to separate the DIPH product.

The distillation was performed on a 40 tray tower at a pressure of 100 millimeters of mercury with a reflux ratio of 5 to 1. About 92% of the feed was taken overhead, yielding a 99.35% pure DIPH product. The compositions of the overhead and bottoms product streams from this distillation were as follows:

| Stream | Composition, wt. percent | | | | | |
|---|---|---|---|---|---|---|
| | Lights | DIPH | β-IPH | t-ROH | α-IPH | Heavies |
| Overhead | 0.22 | 99.35 | 0.32 | 0.11 | Trace | |
| Bottoms | | 62.40 | 0.65 | 1.25 | 35.50 | 0.20 |

Example 8

This example illustrates the alternative two-stage process of this invention. In this example, the effluent from the hydrogenation reactor contained a higher percentage of DIPH, due to a higher conversion in the hydrogenation step reaction. The composition of this crude DIPH effluent from the hydrogenation reactor was as follows:

COMPOSITION, WT. PERCENT
Effluent from hydrogenation reactor

| | |
|---|---|
| Lights | 0.10 |
| DIPH | 92.9 |
| β-IPH | 1.00 |
| t-ROH | 1.00 |
| c-ROH | 0.90 |
| α-IPH | 4.00 |
| Heavies | 0.10 |

This effluent from the hydrogenation reactor was passed directly into an isomerization zone where the temperature was maintained at 180° C. for 4 hours. During this time, air was bubbled through the liquid to isomerize the β-IPH to α-IPH and to oxidize part of the cis- and trans-ROH. Analysis of the stream passing the isomerization was as follows:

Effluent from isomerization unit

| | |
|---|---|
| Lights | 0.20 |
| DIPH | 93.6 |
| β-IPH | 0.30 |
| t-ROH | 0.50 |
| c-ROH | 0.60 |
| α-IPH | 4.70 |
| Heavies | 0.10 |

The effluent from the isomerization unit was then distilled on a 40 tray tower at a pressure of 100 mm. with a reflux ratio of 5 to 1. About 90% of the feed was taken overhead, and it contained 99% DIPH. The composition of the overhead and bottom product streams were as follows:

| Stream | Lights | DIPH | β-IPH | t-ROH | c-ROH | α-IPH | Heavies |
|---|---|---|---|---|---|---|---|
| Overhead | 0.22 | 99.2 | 0.33 | 0.28 | Trace | Trace | |
| Bottoms | | 43.50 | | 2.50 | 6.00 | 47.0 | 1.00 |

What is claimed is:

1. A method for the separating of dihydroisophorone from an oxygenated hydrocarbon mixture containing dihydroisophorone and alpha-isophorone and beta-isophorone impurities which comprises heating said mixture at a temperature in the range of from about 100° to about 300° C. in the presence of a free radical catalyst selected from the group consisting of hydroperoxides having the formula ROOH and peroxides having the formula ROOR, wherein R is a $C_2$ to $C_{15}$ moiety selected from the group consisting of alkyl, cycloalkyl, aryl, and aralkyl radicals to isomerize said beta-isophorone substantially to alpha-isophorone and thereafter distilling the product to separate the dihydroisophorone from the alpha-isophorone and recovering the purified dihydroisophorone product.

2. A method according to claim 1 wherein the free radical catalyst is a hydroperoxide having the formula:

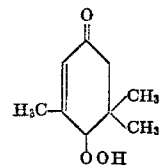

3. A method according to claim 2 wherein the hydroperoxide is formed by contacting the oxygenated hydrocarbon mixture with an oxygen-containing gas stream.

4. A method for the purification of a crude dihydroisophorone feedstock that contains alpha-isophorone and beta-isophorone impurities which comprises heating said dihydroisophorone feedstock at a temperature in the range of from about 100° to about 300° C. in the presence of a free radical catalyst selected from the group consisting of hydroperoxides having the formula and peroxides having the formula ROOR, wherein R is a $C_2$ to $C_{15}$ moiety selected from the group consisting of alkyl, cycloalkyl, aryl, and aralkyl radicals for a time sufficient to isomerize the beta-isophorone substantially to alpha-isophorone and thereafter distilling the product to separate dihydroisophorone from the said alpha-isophorone, and recovering the purified dihydroisophorone product.

5. The process according to claim 4 wherein said free radical catalyst is a hydroperoxide formed by contacting the beta-isophorone in the first zone with an oxygen-containing gas stream.

6. A method for the purification of a dihydroisophorone feedstock that contains alpha-isophorone and beta-isophorone impurities which comprises distilling said dihydroisophorone feedstock in a first zone to separate a distillate comprising dihydroisophorone and beta-isophorone from the residue comprising alpha-isophorone; withdrawing said distillate from said zone and passing said distillate into a second zone, heating said distillate in said second zone in the presence of a free radical catalyst selected from the group consisting of hydroperoxides having the formula ROOH and peroxides having the formula ROOR, wherein R is a $C_2$ to $C_{15}$ moiety selected from the group consisting of an alkyl, cycloalkyl, aryl, or aralkyl radical at a temperature in the range of from about 100° to about 300° C. for a time sufficient to isomerize beta-isophorone substantially to alpha-isophorone; passing the product from said second zone into a third zone, distilling said product in the third zone to separate a distillate comprising dihydroisophorone from the residue comprising alpha-isophorone, and recovering the purified dihydroisophorone product.

7. A method according to claim 6 comprising removing the said residue comprising alpha-isophorone from said first zone as said distillate is withdrawn therefrom.

8. A method according to claim 6 comprising removing the thus formed alpha-isophorone from said third zone as the distillate comprising dihydroisophorone is removed therefrom.

9. The process according to claim 6 wherein said free radical catalyst is a hydroperoxide formed by contacting the distillate from the first zone with an oxygen-containing gas stream.

10. A method for the purification of dihydroisophorone which comprises distilling a dihydroisophorone reaction product containing dihydroisophorone and (A) a lower boiling component boiling below component (B) infra and selected from the group consisting of beta-isophorone, trans-3,3,5-trimethylcyclohexanol, and mixtures thereof and (B) a higher boiling component selected from the group consisting of alpha-isophorone, cis-3,3,5-trimethylcyclohexanol and mixtures thereof from a first zone to separate the distillate containing compounds selected from the group consisting of dihydroisophorone, beta-isophorone and trans-3,3,5-trimethylcyclohexanol from the residue containing compounds selected from the group consisting of alpha-isophorone and cis-3,3,5-trimethylcyclohexanol; withdrawing the distillate from said zone and passing same into a second zone, heating said distillate in said second zone in the presence of a free radical catalyst selected from the group consisting of a hydroperoxide having the formula ROOH and a peroxide having the formula ROOR, wherein R is a $C_2$ to $C_{15}$ moiety selected from the group consisting of alkyl, cycloalkyl, aryl, and aralkyl radicals at a temperature in the range of from about 100° to about 300° C. to isomerize beta-isophorone substantially to alpha-isophorone without causing pyrolysis of the remainder of the distillate, passing the product from said second zone into a third zone, distilling said product in said third zone to separate the distillate comprising dihydroisophrone from the residue comprising alpha-isophorone, and recovering the purified dihydroisophorone product.

11. A method according to claim 10 comprising removing the said residue comprising alpha-isophorone from said first zone as said distillate is withdrawn therefrom.

12. A method according to claim 10 comprising removing the thus formed alpha-isophorone from said third zone, as the distillate comprising dihydroisophorone is removed therefrom.

13. A method according to claim 10 wherein in the free radical catalyst comprises about 0.01 to about 10.0 weight percent based on the beta-isophorone present in the distillate from the first zone.

14. A method according to claim 13 wherein the hydroperoxide is (3,5,5-trimethylcyclohexen-2-one)-4-yl hydroperoxide having the formula:

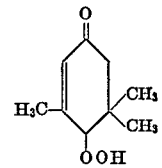

15. A method for the purification of dihydroisophorone which comprises distilling a dihydroisophorone reaction product containing dihydroisophorone and (A) a lower boiling component boiling below (B) infra and selected from the group consisting of beta-isophorone, trans-3,3,5-trimethylcyclohexanol and mixtures thereof and (B) a higher boiling component selected from the group consisting of alpha-isophorone, cis-3,3,5-trimethylcyclohexanol and mixtures thereof in a first zone to separate the distillate containing compound selected from the group consisting of dihydroisophorone, beta-isophorone and trans-3,3,5-trimethylcyclohexanol, from the residue containing compounds selected from the group consisting of alpha-isophorone and cis-3,3,5-trimethylcyclohexanol; withdrawing the distillate from said zone and passing said distillate into a second zone, heating said distillate in said second zone in the presence of a free radical catalyst formed by contacting the distillate with an oxygen-containing gas stream at a temperature in the range of from about 100° to about 300° C. to isomerize beta-isophorone substantially to alpha-isophorone without causing pyrolysis of the remainder of the distillate; passing the effluent from said second zone into a third zone, distilling said effluent in said third zone to separate the distillate comprising dihydroisophorone from the residue comprising alpha-isophorone and recovering the purified dihydroisophorone product.

16. A method according to claim 15 wherein the temperature in said second zone ranges from about 150° to about 225°.

17. A method according to claim 16 wherein the amount of oxygen contained in the oxygen containing gas stream varies from 0.01 to 20.0 moles of oxygen per hour per mole of beta-isophorone initially present in the dihydroisophorone reaction product.

18. A method according to claim 15 comprising removing the said residue comprising alpha-isophorone from said first zone as said distillate is withdrawn therefrom.

19. A method according to claim 15 comprising removing the thus formed alpha-isophorone from said third zone, as the distillate comprising dihydroisophorone is removed therefrom.

References Cited

UNITED STATES PATENTS

| | | | |
|---|---|---|---|
| 2,560,361 | 7/1951 | Morrell et al. | 260—586 |
| 2,692,289 | 10/1954 | Nelson | 260—586 |

OTHER REFERENCES

Zimmerman et al.: "Jour. Am. Chem. Soc." 188:11 Jan. 5, 1966.

Heap et al.: "Jour. Chem. Soc. (B) Phys. Org." 1966, pp. 164–170.

LEON ZITVER, Primary Examiner

N. MORGENSTERN, Assistant Examiner